(12) United States Patent
Benoit et al.

(10) Patent No.: US 9,875,378 B2
(45) Date of Patent: Jan. 23, 2018

(54) PHYSICALLY UNCLONABLE FUNCTION ASSISTED MEMORY ENCRYPTION DEVICE TECHNIQUES

(71) Applicant: QUALCOMM Incorporated, San Diego, CA (US)

(72) Inventors: Olivier Jean Benoit, San Diego, CA (US); Rosario Cammarota, San Diego, CA (US)

(73) Assignee: QUALCOMOM Incorporated, San Diego, CA (US)

( * ) Notice: Subject to any disclaimer, the term of this patent is extended or adjusted under 35 U.S.C. 154(b) by 228 days.

(21) Appl. No.: 14/738,240

(22) Filed: Jun. 12, 2015

(65) Prior Publication Data

US 2016/0364583 A1    Dec. 15, 2016

(51) Int. Cl.
| | |
|---|---|
| G06F 21/00 | (2013.01) |
| G06F 12/14 | (2006.01) |
| G06F 21/79 | (2013.01) |
| H04L 9/32 | (2006.01) |
| H04L 9/08 | (2006.01) |
| G06F 21/73 | (2013.01) |

(Continued)

(52) U.S. Cl.
CPC .......... *G06F 21/79* (2013.01); *G06F 12/1408* (2013.01); *G06F 21/73* (2013.01); *G06F 21/85* (2013.01); *H04L 9/0866* (2013.01); *H04L 9/0897* (2013.01); *H04L 9/3278* (2013.01)

(58) Field of Classification Search
None
See application file for complete search history.

(56) References Cited

U.S. PATENT DOCUMENTS

| | | | |
|---|---|---|---|
| 6,859,535 B1 * | 2/2005 | Tatebayashi | G06F 21/10 380/201 |
| 8,290,150 B2 * | 10/2012 | Erhart | H04L 9/302 380/44 |

(Continued)

FOREIGN PATENT DOCUMENTS

| | | |
|---|---|---|
| DE | 102010045580 A1 | 3/2012 |
| FR | 2991797 A1 | 12/2013 |

(Continued)

OTHER PUBLICATIONS

International Search Report and Written Opinion—PCT/US2016/027812—ISA/EPO—dated Nov. 25, 2016—10 pgs.

(Continued)

*Primary Examiner* — Eric Chen
(74) *Attorney, Agent, or Firm* — Hunter Clark PLLC (57) ABSTRACT

Techniques for encrypting the data in the memory of a computing device are provided. An example method for protecting data in a memory according to the disclosure includes encrypting data associated with a store request using a memory encryption device of the processor to produce encrypted data. Encrypting the data includes: obtaining a challenge value, providing the challenge value to a physically unclonable function module to obtain a response value, and encrypting the data associated with the store request using the response value as an encryption key to generate the encrypted data. The method also includes storing the encrypted data and the challenge value associated with the encrypted data in the memory.

32 Claims, 5 Drawing Sheets

(51) Int. Cl.
*G06F 21/85* (2013.01)
*G06F 11/30* (2006.01)

(56) References Cited

U.S. PATENT DOCUMENTS

| | | | |
|---|---|---|---|
| 8,549,367 | B1 | 10/2013 | Sherred |
| 8,639,949 | B2 | 1/2014 | Van Rijnswou |
| 9,214,183 | B2* | 12/2015 | Van Rijnswou . G11B 20/00086 |
| 2009/0217058 | A1 | 8/2009 | Obereiner et al. |
| 2010/0177898 | A1* | 7/2010 | Tuyls ................. G06F 21/35 |
| | | | 380/270 |
| 2012/0155637 | A1 | 6/2012 | Lambert et al. |
| 2013/0234771 | A1* | 9/2013 | Simons ................. G06F 7/588 |
| | | | 327/215 |
| 2014/0108786 | A1 | 4/2014 | Kreft |
| 2016/0227348 | A1* | 8/2016 | Guo ................. H04W 4/008 |
| 2017/0048058 | A1* | 2/2017 | Ren ................. H04L 9/30 |

FOREIGN PATENT DOCUMENTS

| | | |
|---|---|---|
| WO | 2008152547 A1 | 12/2008 |
| WO | 2014053286 A1 | 4/2014 |

OTHER PUBLICATIONS

International Preliminary Report on Patentability—PCT/US2016/027812—European Patent Office—Munich, Germany—dated Mar. 22, 2017—18 pgs.

\* cited by examiner

PHYSICALLY UNCLONABLE FUNCTION ASSISTED MEMORY ENCRYPTION DEVICE TECHNIQUES

BACKGROUND

The contents of memory of computing devices are susceptible to attacks from malicious parties that may attempt to obtain unauthorized access to the contents of the memory of the computing device and/or to gain control of the computing device by assuming control of the flow of program code being executed by a processor of the computing device. Some attempts to encrypt the data stored in the memory of the computing device have been developed that rely on one or more encryption keys that are stored or built in to the processor of the computing device, but such approaches are susceptible to attack and/or reverse engineering in which an attacker can obtain the built-in keys and defeat the encryption provided.

SUMMARY

An example method for protecting data in a memory according to the disclosure includes encrypting data associated with a store request using a memory encryption device of the processor to produce encrypted data. Encrypting the data includes: obtaining a challenge value, providing the challenge value to a physically unclonable function module to obtain a response value, and encrypting the data associated with the store request using the response value as an encryption key to generate the encrypted data. The method also includes storing the encrypted data and the challenge value associated with the encrypted data in the memory.

Implementations of such a method can include one or more of the following features. Obtaining the challenge value includes obtaining the challenge value from a random number generator associated with the processor. Encrypting the data associated with the store request using the challenge value includes applying an exclusive or (XOR) operation to the data associated with the store request and the response value to generate the encrypted data. Encrypting the data associated with the store request using the challenge value includes applying an exclusive or (XOR) operation to the data associated with the store request, the response value to generate the encrypted data, and an address associated with a memory location in which the encrypted data is to be written. Obtaining the encrypted data and the challenge value associated with the encrypted data from the memory responsive to a read request; and decrypting the encrypted data to generate decrypted data. Decrypting the data includes: providing the challenge value to the strong physically unclonable function module to obtain a recovered response value, and decrypting the data associated with the store request using the recovered response value. Providing the decrypted data to the processor. Decrypting the data associated with the store request using the recovered response value includes applying an exclusive or (XOR) operation to the encrypted data and the recovered response value to generate the decrypted data. Decrypting the data associated with the store request using the recovered response value includes applying an exclusive or (XOR) operation to the encrypted data, the recovered response value, and an address associated with a memory location to which the encrypted data was written, to generate the encrypted data.

An apparatus according to the disclosure includes means for encrypting data associated with a store request using a memory encryption device of the processor to produce encrypted data. The means for encrypting the data in response to the store request includes means for obtaining a challenge value, means for providing the challenge value to a physically unclonable function module to obtain a response value, and means for encrypting the data associated with the store request using the response value as an encryption key to generate the encrypted data. The apparatus also includes means for storing the encrypted data and the challenge value associated with the encrypted data in the memory. The means for obtaining the challenge value comprises means for obtaining the challenge value from a random number generator associated with the processor.

Implementations of such an apparatus may include one or more of the following features. The means for encrypting the data associated with the store request using the challenge value includes means for applying an exclusive or (XOR) operation to the data associated with the store request and the response value to generate the encrypted data. The means for encrypting the data associated with the store request using the challenge value includes means for applying an exclusive or (XOR) operation to the data associated with the store request, the response value to generate the encrypted data, and an address associated with a memory location in which the encrypted data is to be written. Means for obtaining the encrypted data and the challenge value associated with the encrypted data from the memory responsive to a read request, and means for decrypting the encrypted data to generate decrypted data. The means for decrypting the data includes: means for providing the challenge value to the strong physically unclonable function module to obtain a recovered response value, and means for decrypting the data associated with the store request using the recovered response value. Means for providing the decrypted data to the processor. The means for decrypting the data associated with the store request using the recovered response value includes means for applying an exclusive or (XOR) operation to the encrypted data and the recovered response value to generate the decrypted data. The means for decrypting the data associated with the store request using the recovered response value includes means for applying an exclusive or (XOR) operation to the encrypted data, the recovered response value, and an address associated with a memory location to which the encrypted data was written, to generate the encrypted data.

A computing device according to the disclosure includes a processor, a memory, and a memory encryption device. The memory encryption device is configured to encrypt data associated with a store request received from the processor to produce encrypted data. When encrypting the data, the memory encryption device is configured to obtain a challenge value, provide the challenge value to a physically unclonable function module to obtain a response value, and encrypt the data associated with the store request using the response value as an encryption key to generate the encrypted data. The memory encryption device is also configured to store the encrypted data and the challenge value associated with the encrypted data in the memory.

The memory encryption device is configured to obtain the challenge value from a random number generator associated with the processor. The memory encryption device is configured to encrypt the data associated with the store request using the challenge value by applying an exclusive or (XOR) operation to the data associated with the store request and the response value to generate the encrypted data. The memory encryption device is configured to encrypt the data associated with the store request using the challenge value by applying an exclusive or (XOR) operation to the data associated with the store request, the response value to generate the encrypted data, and an address associated with a memory location in which the encrypted data is to be written. The memory encryption device is further configured to: obtain the encrypted data and the challenge value associated with the encrypted data from the memory responsive to a read request; and decrypt the encrypted data to generate decrypted data. When decrypting the data, the memory encryption device is configured to: provide the challenge value to the strong physically unclonable function module to obtain a recovered response value, and decrypt the data associated with the store request using the recovered response value. The memory encryption device is configured to provide the decrypted data to the processor. The memory encryption device is configured to decrypt the data associated with the store request using the recovered response value by applying an exclusive or (XOR) operation to the encrypted data and the recovered response value to generate the decrypted data. The memory encryption device is configured to decrypt the data associated with the store request using the recovered response value by applying an exclusive or (XOR) operation to the encrypted data, the recovered response value, and an address associated with a memory location to which the encrypted data was written, to generate the encrypted data.

An example non-transitory, computer-readable medium according to the disclosure has stored thereon computer-readable instructions for protecting data in a memory. The instructions are configured to cause a computer to obtain a challenge value, provide the challenge value to a physically unclonable function module to obtain a response value, encrypt data associated with a store request using the response value as an encryption key to generate encrypted data, and store the encrypted data and the challenge value associated with the encrypted data.

Implementations of such a non-transitory, computer-readable medium can include one or more of the following features. The instructions configured to cause the computer to obtain the challenge value include instructions configured to cause the computer to obtain the challenge value from a random number generator. The instructions configured to cause the computer to obtain the challenge value include instructions configured to cause the computer to obtain the challenge value from a monotonic counter. The instructions configured to cause the computer to encrypt the data associated with the store request using the challenge value include instructions configured to cause the computer to apply an exclusive or (XOR) operation to the data associated with the store request and the response value to generate the encrypted data. The instructions configured to cause the computer to encrypt the data associated with the store request using the challenge value include instructions configured to cause the computer to apply an exclusive or (XOR) operation to the data associated with the store request, the response value to generate the encrypted data, and an address associated with a memory location in which the encrypted data is to be written. Instructions configured to cause the computer to: obtain the encrypted data and the challenge value associated with the encrypted data from a memory in which the encrypted data is stored responsive to a read request, provide the challenge value to the physically unclonable function module to obtain a recovered response value, decrypting the data associated with the store request using the recovered response value, and provide the decrypted data to a processor.

DETAILED DESCRIPTION

Techniques are disclosed for protecting data in the memory of a computing device using a memory encryption device that provides strong protection for data stored in the memory of the computing device. The techniques discussed herein utilize a memory encryption device (MED) to encrypt data before the data is to be stored in the memory of the computing device. The MED of the techniques discussed herein can utilize a Physically Unclonable Function (PUF) module to generate keys to be used by the MED to encrypt the data that is transmitted across the busses and/or stored in the memory of the computing device. The encryption keys are never transmitted across the data bus or stored with the encrypted data or in the chip. Instead, a challenge value is used to obtain an response value from the PUF module which can be used as the encryption key to encrypt a particular set of data. The challenge value is stored with the encrypted data, and the MED can use the challenge value to recover the encryption key that was used to encrypt the encrypted data. Even if an attacker were able to obtain a challenge value associated with a particular portion of the encrypted data, the attacker would only be able to obtain the key associated with that particular challenge-response pair from the PUF. The MED can be configured to use a different challenge for each portion of data to be encrypted. For example, the MED can be configured such that each block of data can be encrypted with a different key provisioned by the PUF module and the challenge to recover this key can be stored with the encrypted block of data in the memory. When the encrypted block of data is required by the processor, the MED can retrieve the encrypted block of data and challenge value from the memory, obtain the encryption key from the PUF by providing the challenge value to the PUF, and decrypt the block of encrypted data.

The MED utilized in the techniques disclosed herein is an improvement over conventional MEDs, which rely on security by obscurity to ensure data confidentiality in internal and/or external memories and on the busses. The conventional MEDs encrypt data using a secret key that is embedded in the silicon of the chip. This conventional approach is susceptible to cryptanalysis attacks. Cryptanalysis can be used to reveal the one or more keys embedded in the silicon of the chip. Once an attacker has these keys, the data encrypted by the MED can be decrypted by the attacker. The use of a PUF in the techniques disclosed herein do not face these shortcomings as the keys used by the MED are not stored in the silicon and are generated as needed by the PUF.

Example Hardware

Figure 1:
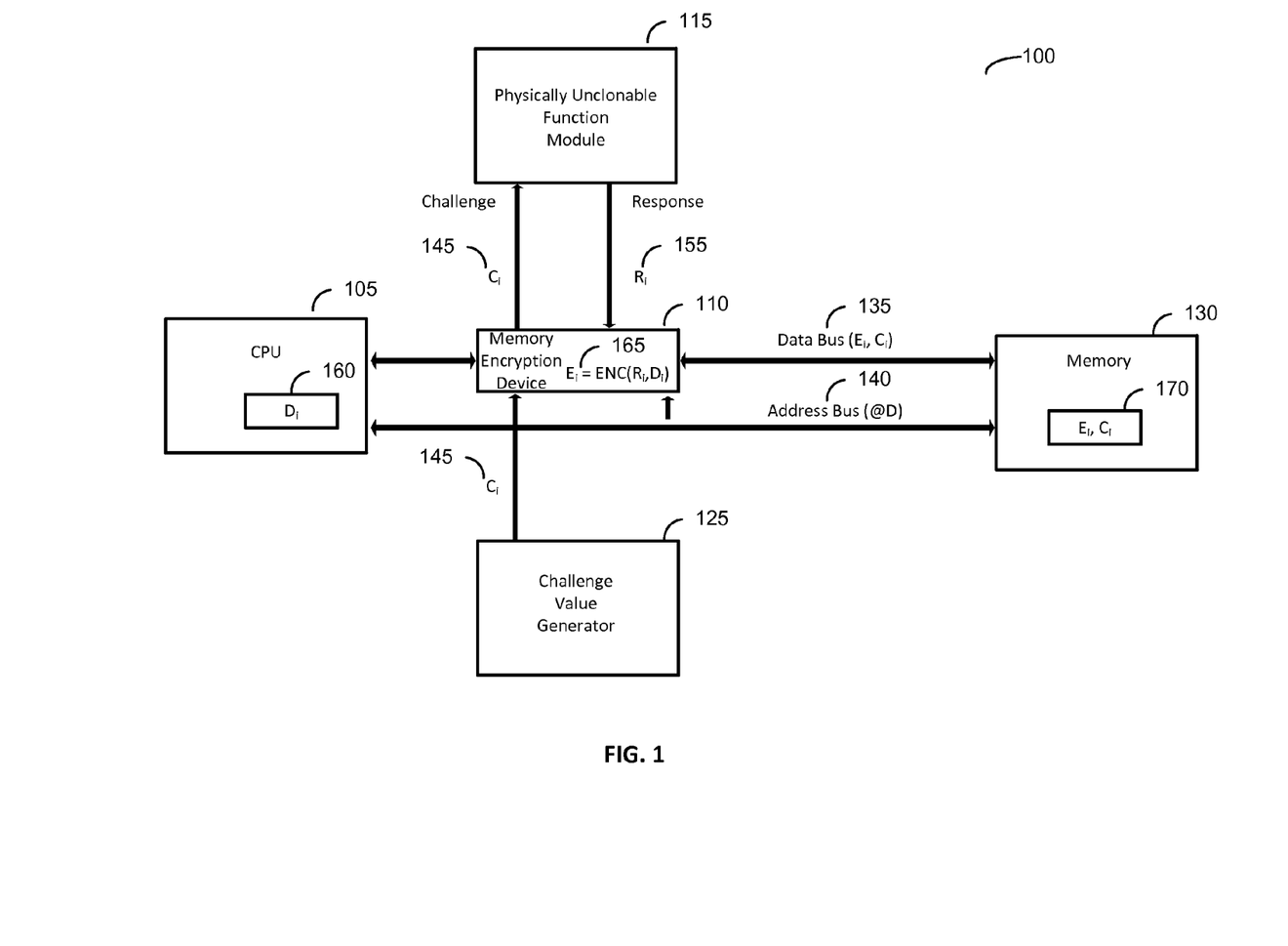
FIG. 1 is a block diagram of a computing device 100 that can be used to implement the techniques disclosed herein.

FIG. 1 is a block diagram of a computing device 100 that can be used to implement the techniques disclosed herein. The computing device can be used to implement, at least in part, the processes illustrated in FIG. 2-10. The computing device 100 comprises a CPU 105, a memory encryption device (MED) 110, a physically unclonable function module 115, a challenge value generator 125, and memory 130. The example computing device 100 illustrated in FIG. 1 is merely an example to illustrate the concepts discussed herein. The techniques discussed herein can be implemented on computing devices that may have additional components not illustrated herein and/or instead of components included in the example illustrated in FIG. 1.

The central processing unit (CPU) 105 (also referred to herein as the processor) comprises electronic circuitry for carrying out computer program instructions. The CPU 105 can comprise components to perform various actions based on computer program instructions include basic arithmetic, logic operations, control operations, and input/output (I/O) operations. The CPU 105 can be configured to receive store instructions which cause the CPU 105 to store data in the memory 130 and read instructions which cause the CPU 105 to retrieve data stored in the memory 130.

The MED 110 can be configured to encrypt data to be stored in the memory 130 and/or sent across the data bus 135, and to store the encrypted data and a challenge value associated with the encrypted data. The MED 110 can implement the encryption and decryption processes illustrated in FIGS. 2-10. The MED 110 can be configured to perform the encryption steps in response to a store data request from the CPU 105, for example, in which the CPU 105 provides the data 160 to the MED 110. The MED 110 can encrypt the data 160 and output encrypted data 165, which can be stored in the memory 130 by sending the encrypted data 165 and the challenge value 145 associated with the encrypted data 165 across the data bus 135 to the memory 130. The encrypted data and the challenge value 145 associated with the encrypted data 165 can be stored at a memory location 170 in the memory 130. In the example illustrated in FIG. 1 there is only a single instance of encrypted data 165 and the challenge value 145 associated with that single instance of encrypted data to simply the illustration of the concepts disclosed herein. However, the MED 110 can store multiple instances of encrypted data 165 and the challenge values associated with each of these instances of encrypted data 165.

The MED 110 can be configured to operate on the data in blocks, such that each block of data is encrypted using a key associated with that particular block of data. The encryption key can be obtained by presenting a challenge value 145 to the PUF module 115 to obtain a response value 155. The MED 110 can use all or a portion of this response value as the encryption key to be used to encrypt the data 160. The MED 110 can be configured to utilize various encryption techniques. For example, the MED 110 can be configured to encrypt the data 160 by applying an exclusive or (XOR) operation to the data 160 and the response value or portion thereof received from the PUF module 115. The use of the XOR algorithm to encrypt the data 160 in this context can provide strong encryption protection for the encrypted data 160, because each block of memory or other segment of memory to be encrypted can be selectively encrypted with a random key using the challenge value 145 provided by the challenge value generator 125 (discussed below) to obtain the encryption key from the PUF module 115. The MED 110 can also be configured utilize other encryption algorithms to encrypt the data 160, such as an Advanced Encryption Standard (AES) algorithm or other encryption algorithm, and is not limited to just the XOR or an AES algorithm.

The PUF module 115 can be implemented utilizing various techniques. In one example implementation, the PUF module 115 can comprise a plurality of ring oscillators. The plurality of ring oscillators (ROs) can be concurrently enabled and their outputs can be sent to two or more switches (multiplexers). A challenge value serves as an input to the switches which causes each switch to then select a single RO from among the plurality of ROs. The challenge value sent to the switches can be designed such that each switch selects a different RO. The selected ROs can each have a slightly different resonating frequency associated with them due to slight manufacturing variations at the semiconductor level even though each may have been manufactured in an attempt to make them identical. The response value 155 can be generated by a pair-wise comparison of these selected ring oscillators' frequencies as measured/stored by a pair of counters. For example, if the first counter detects a higher frequency than the second counter, then a logical "1" may be generated, otherwise a logical "0" may be generated. In this fashion the comparisons made represent a challenge/response mechanism, where the chosen RO pair is the challenge value and the RO frequency comparison result is the response value. The plurality of ring oscillators implementation is merely one example of the types of implementations that could be used to implement the PUF module 115. Other techniques that provide a PUF that is based on physical characteristics of the components of the CPU 105, the memory 130, and/or other components of the computing device 100 that are difficult to predict, easy to evaluate, and reliably provide consistent results can be used to implement the PUF module 115.

The MED 110 can also be configured to access encrypted data 165 stored in the memory 130 and the challenge value 145 associated with the encrypted data 165, and to decrypt the encrypted data 165 to recover the original unencrypted data 160. The MED 110 can implement the decryption processes illustrated in FIGS. 7-10. The MED 110 can be configured to perform the decryption steps in response to a read data request from the CPU 105, for example, in which the CPU 105 provides the address of the data to be read to the MED 110. The MED 110 can be configured to access the encrypted data 165 and the challenge value 145 associated with the encrypted data 165 at the memory location 170 in the memory 130. Where the memory location 170 corresponds to the memory location of the data requested in the read data request. The memory location 170 associated with instance of encrypted data 165 stored in the memory 130 will vary for each instance of encrypted data 165 that is stored in the memory 130, as each instance of the encrypted data 165 is written to a separate memory location in the memory 130. The MED 110 can use the challenge value 145 associated with the encrypted data retrieved from the memory location 170 to retrieve the encryption key used to encrypt the encrypted data 115. The MED 110 can provide the challenge value 145 to the PUF module 115 to obtain a response value from the PUF module 115. Assuming that the challenge value was not altered or corrupted while in the memory 130, the PUF module 115 should provide a recovered response value that is identical to the response value 155 that was used to encrypt the encrypted data. The MED 110 can select all or a portion of the recovered response value to use as the key to decrypt the encrypted data 165. The MED 110 can be configured to select the same portions of the recovered response value as were selected from the response value 155 and/or to perform the same operations that were performed on the response value 155 to regenerate the key that was used to encrypt the encrypted data 165.

The computing device can also include a challenge value generator 125. The challenge value generator 125 can include a random number generator (RNG) that can be configured to provide a random number to the MED 110, which the MED 110 can use as the challenge value 145 to be presented to the PUF module 115 to obtain a response value 155 which can in turn be used to encrypt the data 160 from the CPU 105. The challenge value generator 125 include a monotonic counter that can provide a unique value each time that the value is read, and the MED 110 can be configured to read a counter value from the monotonic counter which the MED 110 can use as an encryption key for encrypting the data. Other types of challenge value generators can also be used by the MED 110 to generate the challenge value to be presented to the PUF module 115. The size of the challenge value can vary and may be dependent upon the size of the memory 130 for which the data is to be encrypted. The challenge value can include a sufficient number of bits to ensure that each block of the memory 130 can be protected with a unique challenge value.

The MED 110, the PUF module 115, and the challenge value generator 125 have each been illustrated as separate components from the CPU 105 for the sake of clarity. However, one or more of the MED 110, PUF module 115, and the challenge value generator 125 can be implemented as components of the CPU 105.

Example Implementations

Figure 2:
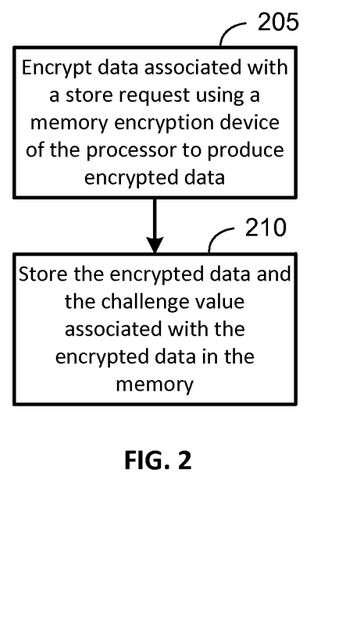
FIG. 2 is a flow diagram of an example process for protecting data in a memory according to the techniques discussed herein.

FIG. 2 is a flow diagram of an example process for protecting data in a memory according to the techniques discussed herein. The process illustrated in FIG. 2 can be implemented by the computing device 100 illustrated in FIG. 1. The memory encryption device 110 of the computing device 100 can provide means for performing the various stages of the process illustrated in FIG. 2 unless otherwise specified.

Figure 3:
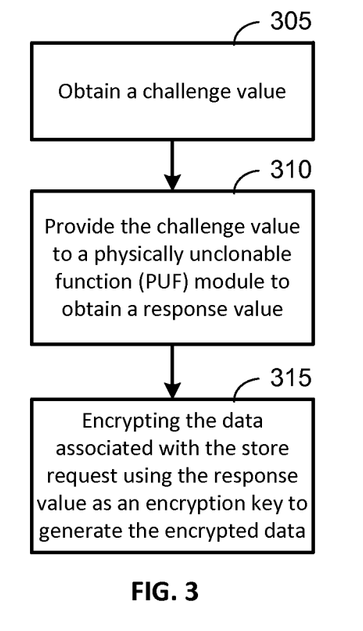
FIG. 3 is a flow diagram of an example process for encrypting data according to the techniques disclosed herein.

Data associated with a store request can be encrypted using a memory encryption device of the processor to produce encrypted data (stage 205). The MED 110 can receive a store request from the CPU 105 to store unencrypted data 160. The unencrypted data 160 can comprise a block of data or may comprise a different sized portion of data to be stored in the memory 130 of the computing device 100. The MED 110 can be configured to present a challenge value 145 to the PUF module 115 to obtain a response value 155 from the PUF module 115. The MED 110 can use all or a portion of the response value 155 as an encryption key to encrypt the data 160. FIG. 3 illustrates an example process that the MED 110 can use to encrypt the data 160. The MED 110 can be configured to use various encryption algorithms to encrypt the data 160, such as an XOR encryption algorithm, an AES algorithm, and/or other encryption algorithms.

The encrypted data and the challenge value associated with the encrypted data can be stored in the memory of the computing device (stage 210). The encrypted data 165 can be provided to the memory 130 for storage at memory location 170 via the data bus 135. The challenge value used to obtain the key from the PUF module 115 can also be stored with the encrypted data 165 at the memory location 170 of the memory 130. The challenge value 145 associated with the encrypted data can be used to retrieve the encryption key needed to decrypt the data from the PUF module 115. Only the challenge value 145 is stored with the encrypted data 165. Therefore, even if an attacker were able to gain access to the memory location 170 to obtain the encrypted data 165 and the challenge value 145, the challenge value 145 alone is insufficient to decrypt the encrypted data 165, and because the encryption key was generated by the PUF module 115, the attacker is unlikely to be able to predict what the encryption key derived from the response value 155 would be just from the challenge value 145 alone.

FIG. 3 is a flow diagram of an example process for encrypting data according to the techniques disclosed herein. The process illustrated in FIG. 3 can be used to implement stage 205 of the process illustrated in FIG. 2. The process illustrated in FIG. 3 can be implemented by the computing device 100 illustrated in FIG. 1. The memory encryption device 110 of the computing device 100 can provide means for performing the various stages of the process illustrated in FIG. 3 unless otherwise specified.

A challenge value can be obtained (stage 305). The challenge value 145 is a value to be provided to the PUF module 115, which generate the response value 155 in response to the challenge value 145. The MED 110 can be configured to obtain a new challenge value each time that the MED 110 receives a store request from the CPU 105. The challenge value can be a random number, and can be obtained from the challenge value generator 125. The MED 110 can also be configured to use other techniques for generating the challenge value.

The challenge value can be provided to a physically unclonable function (PUF) module to obtain a response value (stage 310). The MED 110 can provide the challenge value 145 to the PUF module 115 to obtain the response value 155. The nature of the PUF module 115 makes it very difficult to predict the response value 155 obtained from the PUF module 115 based on the challenge value 145.

Figure 4:
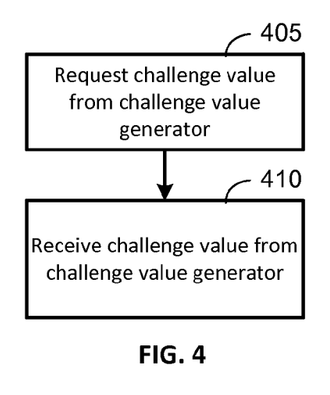
FIG. 4 is a flow diagram of an example process for obtaining a challenge value according to the techniques discussed herein.
Figure 5:
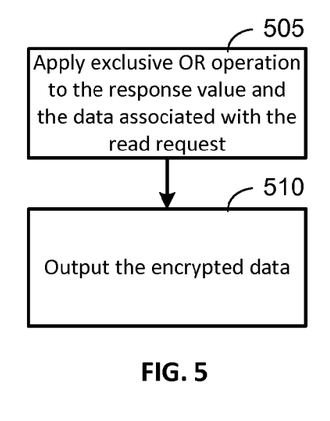
FIG. 5 is a flow diagram of an example process for encrypting data according to the techniques disclosed herein.

The data associated with the store request can be encrypted using the response values as an encryption key to generate the encrypted data (stage 315). The MED 110 can be configured to apply an encryption algorithm to the data 160 using at least a portion of the response value 155 as an encryption key to generate the encrypted data 165. The MED 110 can be configured to apply different encryption techniques for encrypting the data. FIGS. 4 and 5 provide examples of processes in which the MED 110 applies an XOR encryption algorithm to encrypt the data 160. The MED 110 can be configured to apply other types of encryption algorithms to the data 160 using at least a portion of the response value 155 as an encryption key, such as an AES algorithm.

FIG. 4 is a flow diagram of an example process for obtaining a challenge value according to the techniques discussed herein. The process illustrated in FIG. 4 can be used to implement stage 305 of the process illustrated in FIG. 3. The process illustrated in FIG. 4 can be implemented by the computing device 100 illustrated in FIG. 1. The memory encryption device 110 of the computing device 100 can provide means for performing the various stages of the process illustrated in FIG. 4 unless otherwise specified.

A challenge value can be requested from a random number generator (stage 405). As discussed above, the challenge value generator 125 can include a random number generator, and the MED 110 can be configured to request a random number value from the RNG, which the MED 110 can use as the challenge value 145 to be presented to the PUF module 115 in order to obtain a response value 155 that can be used as an encryption key for encrypting the data 160. The challenge value generator 125 can also include a monotonic counter that can provide a unique value each time that the value is read, and the MED 110 can be configured to read a counter value from the monotonic counter which the MED 110 can use as an encryption key for encrypting the data. Other types of challenge value generators can also be used by the MED 110 to generate the challenge value to be presented to the PUF module 115.

The challenge value can be received from the challenge value generator (stage 410). The challenge value generator 125 can be configured to provide the challenge value to the MED 110. The MED 110 can be configured to provide the challenge value to the PUF module 115 as received from the challenge value generator 125. The MED 110 can also be configured to perform one or more operations on the challenge value in order to obtain the challenge value 145 to be provided to the PUF module 115. For example, the MED 110 can be configured to select a predetermined number of bits from the challenge value received from the challenge value generator 125. For example, the MED 110 can be configured to select the first 4 bits and the last 4 bits of the challenge value received from the challenge value generator 125. The MED 110 can also be configured to adjust the random number value fall within a predetermined range of challenge values expected by the PUF module 115. The examples provided are meant to provide examples that illustrate some of the processing that the MED 110 may perform on the value obtained from the challenge value generator 125 and are not meant to be exclusive.

FIG. 5 is a flow diagram of an example process for encrypting data according to the techniques disclosed herein. The process illustrated in FIG. 5 can be used to implement stage 315 of the process illustrated in FIG. 3. The process illustrated in FIG. 5 can be implemented by the computing device 100 illustrated in FIG. 1. The memory encryption device 110 of the computing device 100 can provide means for performing the various stages of the process illustrated in FIG. 5 unless otherwise specified.

An exclusive OR (XOR) operation can be applied to the response value from the PUF module and the data associated with the read request (stage 505). The MED 110 can be configured to apply an XOR operation to the data 160 and at least a portion of the response value 155 received from the PUF module 115. For example, the MED 110 can be configured to select a predetermined number of bits from the response value 155 to be used as the encryption key. For example, the MED 110 can be configured to select the first X number of bits and the last Y numbers bits of the challenge value received from the challenge value generator 125, where X and Y are integer values, and X and Y add up to the number of bits of the data 160 to be encrypted. The MED 110 can also be configured to perform other operations on the response value in order to obtain the key. For example, the MED 110 can be configured to apply a modulo operation to the response value to keep the encryption key within a predetermined range or number of bits.

The encrypted data can be output (stage 510). The MED 110 can be configured to output the encrypted data 160. The MED 110 can be configured to store the encrypted data 165 at the memory location 170 of the memory 130. The MED 110 can also be configured to provide the encrypted data 165 to the CPU 105, which can be configured to process encrypted data.

Figure 6:
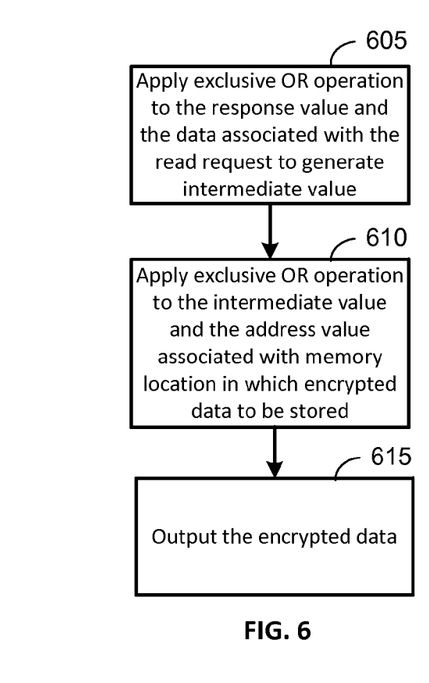
FIG. 6 is a flow diagram of an example process for encrypting data according to the techniques discussed herein.

FIG. 6 is a flow diagram of an example process for encrypting data according to the techniques discussed herein. The process illustrated in FIG. 6 can be used to implement stage 315 of the process illustrated in FIG. 3. The process illustrated in FIG. 6 can be implemented by the computing device 100 illustrated in FIG. 1. The memory encryption device 110 of the computing device 100 can provide means for performing the various stages of the process illustrated in FIG. 6 unless otherwise specified. The process illustrated in FIG. 6 is similar to the process illustrated in FIG. 5, but the process illustrated in FIG. 6 also utilizes the address of the address location 170 in the memory 130 where the encrypted data 165 is to be stored to further encrypt the data. The MED 110 can be configured to perform XOR operations on the response value from the PUF module 115 (serving as the encryption key), the data 160 to be encrypted, and the address 170 associated with the memory location in which the encrypted data is to be stored in any order because the XOR operation is transitive. Accordingly, order in which these operations are performed in the process illustrated in FIG. 6 is just one example of the process for encrypting the data 160 using these three values, and other implementations can be performed in a different order.

An exclusive OR (XOR) operation can be applied to the response value from the PUF module and the data associated with the read request to generate an intermediate value (stage 605). The intermediate value is similar to that generated in stage 505 of the process illustrated in FIG. 5.

An exclusive OR (XOR) operation can be applied to intermediate value and the address value associated with the memory location in which the encrypted data is to be stored (stage 610). The MED 110 can apply a XOR operation to the address value associated with the memory location 170 in the memory 130 and the intermediate value determine in stage 605 to generate the encrypted data 165.

The encrypted data can be output (stage 615). The MED 110 can be configured to output the encrypted data 160. The MED 110 can be configured to store the encrypted data 165 at the memory location 170 of the memory 130. The MED 110 can also be configured to provide the encrypted data 165 to the CPU 105, which can be configured to process encrypted data.

Figure 7:
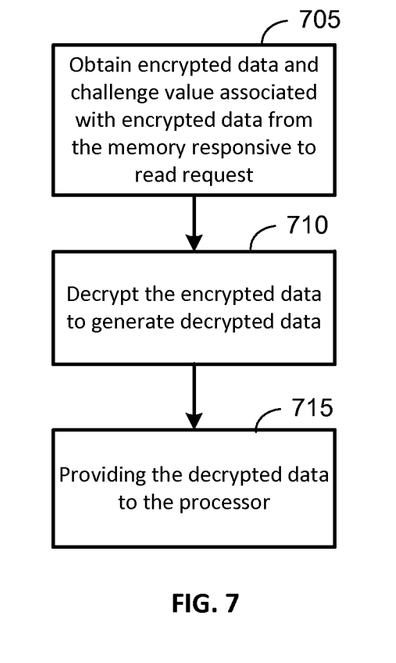
FIG. 7 is a flow diagram of an example process for decrypting data according to the techniques disclosed herein.

FIG. 7 is a flow diagram of an example process for decrypting data according to the techniques disclosed herein. The process illustrated in FIG. 7 can follow the process illustrated in FIG. 2 and can be used to decrypt data that has been encrypted according to the process illustrated in FIG. 2. The process illustrated in FIG. 7 can be implemented by the computing device 100 illustrated in FIG. 1. The memory encryption device 110 of the computing device 100 can provide means for performing the various stages of the process illustrated in FIG. 7 unless otherwise specified.

Encrypted data 165 and a challenge value 145 associated with the encrypted data can be obtained from the memory 130 responsive to a read request from the CPU 105 (stage 705). The read request can specify the address of the memory location 170 at which the encrypted data 165, and the challenge value 145 associated with the encrypted data, are stored. As discussed above, the MED 110 can store multiple instances of encrypted data 165 and the respective challenge value 145 associated with each of the instances of the encrypted data 165. Accordingly, each instance of the encrypted data 165 would be associated with a respective memory location 170 in the memory 130 at which that instance of the encrypted data 165 could be found.

Figure 8:
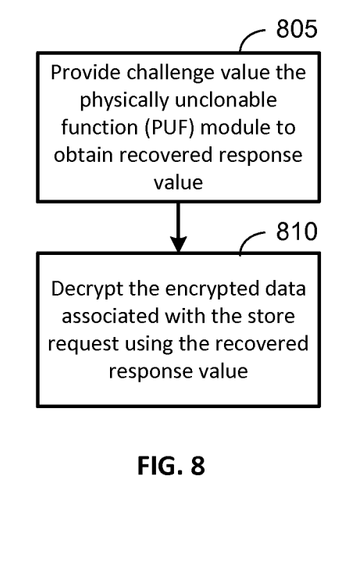
FIG. 8 is a flow diagram of an example process for decrypting data according to the techniques disclosed herein.
Figure 9:
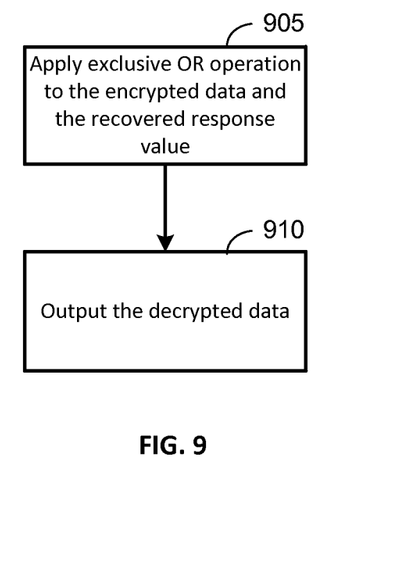
FIG. 9 is a flow diagram of an example process for decrypting data according to the techniques disclosed herein.
Figure 10:
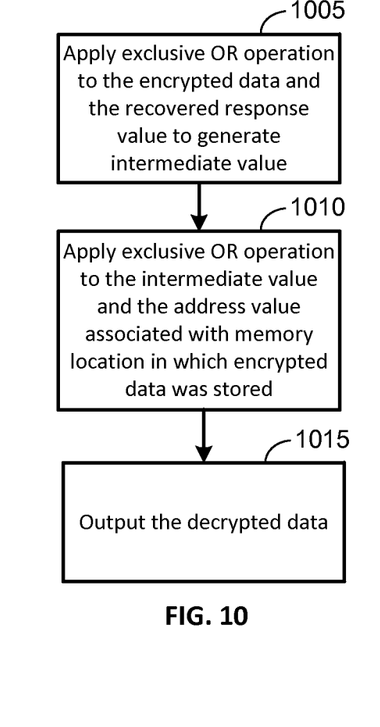
FIG. 10 is a flow diagram of an example process for decrypting data according to the techniques disclosed herein

The encrypted data 165 can be decrypted to generate decrypted data 160 (stage 710). The MED 110 can decrypt the encrypted data 110 using the challenge value 145 associated with the encrypted data 165. The MED 110 can be configured to decrypt the encrypted data 110 using an appropriate decryption technique based on the encryption technique that the MED 110 used to encrypt the data. For example, the MED 110 can be configured to encrypt the data using an XOR technique as discussed above. The MED 110 can also be configured to encrypt the data using other techniques as well, such as an AES encryption algorithm. FIGS. 8, 9, and 10 provide example processes for decrypting the encrypted data 165 where the encrypted data 165 was encrypted using an XOR encryption algorithm.

The decrypted data 160 can be provided to the CPU 105 or other component of the computing device 100 (stage 715). The MED 110 can provide the decrypted data 160 to the CPU 105 or other component of the computing device 100. The CPU 105 may perform one or more operations on the decrypted data 160 or the decrypted data 160 can be provided to a peripheral device for processing by the peripheral device. For example, the decrypted data 160 can be provided to a graphics processor for determining information to display on a display associated with the computing device 100. Other types of peripheral devices can receive the decrypted data 160 for processing.

FIG. 8 is a flow diagram of an example process for decrypting data according to the techniques disclosed herein. The process illustrated in FIG. 8 can be used to implement stage 710 of the process illustrated in FIG. 7. The process illustrated in FIG. 8 can be implemented by the computing device 100 illustrated in FIG. 1. The memory encryption device 110 of the computing device 100 can provide means for performing the various stages of the process illustrated in FIG. 8 unless otherwise specified.

The challenge value 145 can be provided to the PUF module 115 to obtain a recovered responsive value (stage 805). The challenge value 145 that was stored in the memory location 170 of the memory 130 can be provided to the PUF module 115 to receive a recovered response value. The recovered response value can be used by the MED 110 as a decryption key for decrypting the encrypted data 110. In some implementations, the challenge value 145 may be stored at a different memory location in the memory 130 than the encrypted data 165. The MED 110 can be configured to maintain a mapping between the memory locations of the encrypted data 165 and the challenge value 145 associated with each instance of encrypted data 165.

The encrypted data 165 can be decrypted using the recovered response value (stage 810). The MED 110 can decrypt the encrypted data 110 using at least a portion of the response value obtained from the PUF module 115 as the decryption key. The MED 110 can be configured to decrypt the encrypted data 110 using an appropriate decryption technique based on the encryption technique that the MED 110 used to encrypt the data. For example, the MED 110 can be configured to encrypt the data using an XOR technique as discussed above. The MED 110 can also be configured to encrypt the data using other techniques as well, such as an AES encryption algorithm. FIGS. 9 and 10 provide example processes for decrypting the encrypted data 165 where the encrypted data 165 was encrypted using an XOR encryption algorithm.

FIG. 9 is a flow diagram of an example process for decrypting data according to the techniques disclosed herein. The process illustrated in FIG. 9 can be used to implement stage 810 of the process illustrated in FIG. 8. The process illustrated in FIG. 9 can be implemented by the computing device 100 illustrated in FIG. 1. The memory encryption device 110 of the computing device 100 can provide means for performing the various stages of the process illustrated in FIG. 9 unless otherwise specified.

An exclusive OR (XOR) operation can be applied to the encrypted data 165 and the recovered response value (stage 905). The MED 110 can be configured to apply an XOR operation to the encrypted data 165 and at least a portion of the recovered response value received from the PUF module 115 responsive to providing the challenge value 145 obtained from the memory 130 to the PUF module 115. For example, the MED 110 can be configured to select a predetermined number of bits from the recovered response value to be used as the decryption key. The bits selected are dependent on which bits where originally selected from the response value 155 that was obtained from the PUF module 115 when the encrypted data 165 was encrypted. The MED 110 can also be configured to perform other operations on the response value in order to obtain the key, depending on the processing the MED 110 did to the response value 155 to generate the key with which the encrypted data 165 was encrypted.

The decrypted data can then be output by the MED 110 (stage 910). The MED 110 can provide the decrypted data 160 to the CPU 105 or other component of the computing device 100.

FIG. 10 is a flow diagram of an example process for decrypting data according to the techniques disclosed herein. The process illustrated in FIG. 10 can be used to implement stage 810 of the process illustrated in FIG. 8. The process illustrated in FIG. 10 can be implemented by the computing device 100 illustrated in FIG. 1. The memory encryption device 110 of the computing device 100 can provide means for performing the various stages of the process illustrated in FIG. 10 unless otherwise specified. The process illustrated in FIG. 10 is similar to the process illustrated in FIG. 9, but the process illustrated in FIG. 10 also utilizes the address of the address location 170 in the memory 130 where the encrypted data 165 was stored to decrypt the data. The MED 110 can be configured to perform XOR operations on the recovered response value from the PUF module 115 (serving as the decryption key), the encrypted data 165 to be decrypted, and the address 170 associated with the memory location in which the encrypted data 165 was stored in any order because the XOR operation is transitive. Accordingly, order in which these operations are performed in the process illustrated in FIG. 10 is just one example of the process for decrypting the encrypted data 160 using these three values, and other implementations can be performed in a different order.

An exclusive OR (XOR) operation can be applied to the encrypted data 165 and the recovered response value to generate an intermediate value (stage 1005). The first XOR operation reverses the XOR operation performed in stage 605 of the process illustrated in FIG. 6 in which at least a portion of the response value 155 from the PUF module 115 was used to perform the first encryption operation on the data 160 to generate the encrypted data 165.

An exclusive OR (XOR) operation can be applied to the intermediate value and the address value associated with memory location in which encrypted data was stored to generate the decrypted data (stage 1010). The second XOR operation reverses the XOR operation performed in stage 610 of the process illustrated in FIG. 6 in which the address value associated with the memory location 170 associated with the encrypted data 165 being decrypted was used to generate the encrypted data 165. The encrypted data 165 should now have been returned to the original unencrypted state and should match the unencrypted data 160 that was originally provided by the CPU 105 to the MED 110 for encryption.

The decrypted data can then be output by the MED 110 (stage 1015). The MED 110 can provide the decrypted data 160 to the CPU 105 or other component of the computing device 100.

The methodologies described herein may be implemented by various means depending upon the application. For example, these methodologies may be implemented in hardware, firmware, software, or any combination thereof. For a hardware implementation, the processing units may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof.

For a firmware and/or software implementation, the methodologies may be implemented with modules (e.g., procedures, functions, and so on) that perform the functions described herein. Any machine-readable medium tangibly embodying instructions may be used in implementing the methodologies described herein. For example, software codes may be stored in a memory and executed by a processor unit. Memory may be implemented within the processor unit or external to the processor unit. As used herein the term "memory" refers to any type of long term, short term, volatile, nonvolatile, or other memory and is not to be limited to any particular type of memory or number of memories, or type of media. Tangible media include one or more physical articles of machine readable media, such as random access memory, magnetic storage, optical storage media, and so on.

If implemented in firmware and/or software, the functions may be stored as one or more instructions or code on a computer-readable medium. Examples include computer-readable media encoded with a data structure and computer-readable media encoded with a computer program. Computer-readable media includes physical computer storage media. A storage medium may be any available medium that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to store desired program code in the form of instructions or data structures and that can be accessed by a computer; disk and disc, as used herein, includes compact disc (CD), laser disc, optical disc, digital versatile disc (DVD), and Blu-ray disc where disks usually reproduce data magnetically, while discs reproduce data optically with lasers. Combinations of the above should also be included within the scope of computer-readable media. Such media also provide examples of non-transitory media, which can be machine readable, and wherein computers are an example of a machine that can read from such non-transitory media.

The generic principles discussed herein may be applied to other implementations without departing from the spirit or scope of the disclosure or claims.

What is claimed is:

1. A method for protecting data in a memory, the method comprising:
   encrypting data associated with a store request using a memory encryption device implemented in a processor to produce encrypted data, wherein encrypting the data comprises:
      obtaining a unique challenge value, from a challenge value generator of the processor, for each block of the data to be encrypted and written to a block of the memory,
      providing the challenge value to a physically unclonable function implemented in the processor to obtain a response value unique to the block of data to be encrypted and written to the block of the memory,
      determining an encryption key, using the memory encryption device, based on the response value obtained from the physically unclonable function module, wherein the encryption key is inaccessible from outside of the processor and is not stored in the processor, and
      encrypting the data associated with the store request using the memory encryption device and using the encryption key to generate the encrypted data; and
   storing each block of the encrypted data and the challenge value associated with each block of the encrypted data in the memory, the memory being external to the processor, each block of the encrypted data and the challenge value being stored at a memory location specified in the store request.

2. The method of claim 1, wherein obtaining the challenge value comprises obtaining the challenge value from a random number generator implemented in the processor.

3. The method of claim 1, wherein obtaining the challenge value comprises obtaining the challenge value from a monotonic counter implemented in the processor.

4. The method of claim 1, wherein encrypting the data associated with the store request using the challenge value comprises applying an exclusive or (XOR) operation to the data associated with the store request and the response value to generate the encrypted data.

5. The method of claim 1, wherein encrypting the data associated with the store request using the challenge value comprises applying an exclusive or (XOR) operation to the data associated with the store request, the response value to generate the encrypted data, and an address associated with a memory location in which the encrypted data is to be written.

6. The method of claim 1, further comprising:
   obtaining the encrypted data and the challenge values associated with the encrypted data from the memory responsive to a read request; and
   decrypting, using the memory encryption device, each block of the encrypted data to generate decrypted data, wherein decrypting each block of the encrypted data comprises:
      providing the challenge value associated with the encrypted block of data to the physically unclonable function module to obtain a recovered response value, and decrypting the encrypted block of data using the recovered response value, and providing the decrypted data to the processor.

7. The method of claim 6, wherein decrypting the data associated with the store request using the recovered response value comprises applying an exclusive or (XOR) operation to the encrypted data and the recovered response value to generate the decrypted data.

8. The method of claim 6, wherein decrypting the data associated with the store request using the recovered response value comprises applying an exclusive or (XOR) operation to the encrypted data, the recovered response value, and an address associated with a memory location to which the encrypted data was written, to generate the encrypted data.

9. The method of claim 1, wherein the physically unclonable function module comprises a plurality of ring oscillators, wherein providing the challenge value to the physically unclonable function module to obtain the response value further comprises selecting, based on the challenge value, a subset of the ring oscillators from the plurality of ring oscillator to provide the an output value to be used to generate the response value.

10. The method of claim 1, wherein the physically unclonable function is configured to generate the response value based on physical characteristics of one or more components of the processor.

11. An apparatus comprising:
processing means comprising:
means for obtaining a unique challenge value for protecting a block of data to be encrypted and written to a block of memory external to the processing means;
means for providing the challenge value to a physically unclonable function module implemented in the processing means to obtain a response value unique to the block of data to be encrypted and written to the block of the memory external to the processing means;
means for determining an encryption key based on the response value obtained from the physically unclonable function module, wherein the encryption key is inaccessible from outside of the processing means and is not stored in the processing means, and
means for encrypting data associated with a store request in the processor using the encryption key to generate encrypted data; and
means for storing each block of the encrypted data and the challenge value associated with each block of the encrypted data in the memory, each block of the encrypted data and the challenge value being stored at a memory location specified in a store request.

12. The apparatus of claim 11, wherein the means for obtaining the challenge value comprises means for obtaining the challenge value from a random number generator.

13. The apparatus of claim 11, wherein the means for obtaining the challenge value comprises means for obtaining the challenge value from a monotonic counter.

14. The apparatus of claim 11, wherein the means for encrypting the data associated with the store request using the challenge value comprises means for applying an exclusive or (XOR) operation to the data associated with the store request and the response value to generate the encrypted data.

15. The apparatus of claim 11, wherein the means for encrypting the data associated with the store request using the challenge value comprises means for applying an exclusive or (XOR) operation to the data associated with the store request, the response value to generate the encrypted data, and an address associated with a memory location in which the encrypted data is to be written.

16. The apparatus of claim 11, wherein the processing means further comprises:
means for obtaining the encrypted data and the challenge values associated with the encrypted data from the memory in which the encrypted data is stored responsive to a read request;
means for providing the challenge value associated with each block of encrypted data to the physically unclonable function module to obtain a recovered response value for the block of the encrypted data; and
means for decrypting each block of the encrypted data using the recovered response value associated with the encrypted block of data.

17. The apparatus of claim 16, wherein the means for decrypting the data associated with the store request using the recovered response value comprises means for applying an exclusive or (XOR) operation to the encrypted data and the recovered response value to generate the decrypted data.

18. The apparatus of claim 16, wherein the means for decrypting the data associated with the store request using the recovered response value comprises means for applying an exclusive or (XOR) operation to the encrypted data, the recovered response value, and an address associated with a memory location to which the encrypted data was written, to generate the encrypted data.

19. A computing device comprising:
a processor; and
a memory coupled to the processor and external to the processor, and
the processor comprising a memory encryption device, the memory encryption device being configured to:
obtain a unique challenge value, from a challenge value generator of the processor, for protecting a block of data associated with a store request, the data to be encrypted and written to a block of the memory;
provide the challenge value to a physically unclonable function module implemented in the processor to obtain a response value unique to the block of data to be encrypted and written to the block of the memory;
determine an encryption key based on the response value obtained from the physically unclonable function module, wherein the encryption key is inaccessible from outside of the processor and is not stored in the processor, and
encrypt data associated with a store request using the encryption key to generate encrypted data; and
store each block of the encrypted data and the challenge value associated with each block of the encrypted data in the memory, each block of the encrypted data and the challenge value being stored at a memory location specified in the store request.

20. The computing device of claim 19, wherein the memory encryption device is configured to obtain the challenge value from a random number generator implemented in the processor.

21. The computing device of claim 19, wherein the memory encryption device is configured to obtain the challenge value from a monotonic counter implemented in the processor.

22. The computing device of claim 19, wherein the memory encryption device is configured to encrypt the data associated with the store request using the challenge value by applying an exclusive or (XOR) operation to the data associated with the store request and the response value to generate the encrypted data.

23. The computing device of claim 19, wherein the memory encryption device is configured to encrypt the data associated with the store request using the challenge value by applying an exclusive or (XOR) operation to the data associated with the store request, the response value to generate the encrypted data, and an address associated with a memory location in which the encrypted data is to be written.

24. The computing device of claim 19, wherein the memory encryption device is further configured to:
obtain the encrypted data and the challenge values associated with the encrypted data from the memory responsive to a read request; and
decrypt, using the memory encryption device, each block of the encrypted data to generate decrypted data, wherein for each block of encrypted data, the memory encryption device is configured to:
provide the challenge value associated with the encrypted block of data to the physically unclonable function module to obtain a recovered response value associated with the encrypted block of data, and
decrypt each block of the encrypted block of data using the recovered response value associated with the encrypted block of data, and
provide the decrypted data to the processor.

25. The computing device of claim 24, wherein the memory encryption device is configured to decrypt the data associated with the store request using the recovered response value by applying an exclusive or (XOR) operation to the encrypted data and the recovered response value to generate the decrypted data.

26. The computing device of claim 24, wherein the memory encryption device is configured to decrypt the data associated with the store request using the recovered response value by applying an exclusive or (XOR) operation to the encrypted data, the recovered response value, and an address associated with a memory location to which the encrypted data was written, to generate the encrypted data.

27. A non-transitory, computer-readable medium, having stored thereon computer-readable instructions for protecting data in a memory, comprising instructions configured to cause a computer to:
obtain a unique challenge value for protecting a block of data associated with a store request, the block of data to be written to a block of the memory external to a processor, wherein the unique challenge value is obtained from a challenge value generator implemented in a processor of the computer;
provide the challenge value to a physically unclonable function module implemented in the processor to obtain a response value unique to the block of data to be encrypted and written to the block of the memory;
determine an encryption key, using a memory encryption device implemented in the processor, based on the response value obtained from the physically unclonable function module, wherein the encryption key is inaccessible from outside of the processor and is not stored in the processor, and
encrypt data associated with a store request using the memory encryption device and using the encryption key to generate encrypted data; and
store each block of the encrypted data and the challenge value associated with each block of the encrypted data in the memory, each block of the encrypted data and the challenge value being stored at a memory location specified in the store request.

28. The non-transitory, computer-readable medium of claim 27, wherein the instructions configured to cause the computer to obtain the challenge value comprise instructions configured to cause the computer to obtain the challenge value from a random number generator implemented in the processor.

29. The non-transitory, computer-readable medium of claim 27, wherein the instructions configured to cause the computer to obtain the challenge value comprise instructions configured to cause the computer to obtain the challenge value from a monotonic counter implemented in the processor.

30. The non-transitory, computer-readable medium of claim 27, wherein the instructions configured to cause the computer to encrypt the data associated with the store request using the challenge value comprise instructions configured to cause the computer to apply an exclusive or (XOR) operation to the data associated with the store request and the response value to generate the encrypted data.

31. The non-transitory, computer-readable medium of claim 27, wherein the instructions configured to cause the computer to encrypt the data associated with the store request using the challenge value comprise instructions configured to cause the computer to apply an exclusive or (XOR) operation to the data associated with the store request, the response value to generate the encrypted data, and an address associated with a memory location in which the encrypted data is to be written.

32. The non-transitory, computer-readable medium of claim 27, further comprising instructions configured to cause the computer to:
obtain the encrypted data and the challenge values associated with the encrypted data from a memory in which the encrypted data is stored responsive to a read request;
provide the challenge value associated with each encrypted block of data to the physically unclonable function module to obtain a recovered response value associated with the encrypted block of data; and
decrypting, using the memory encryption device, each block of the encrypted block of data using the recovered response value associated with the encrypted block of data.

* * * * *